United States Patent
Sawada

(10) Patent No.: US 8,397,187 B2
(45) Date of Patent: Mar. 12, 2013

(54) VERIFYING THE ERROR BOUND OF NUMERICAL COMPUTATION IMPLEMENTED IN COMPUTER SYSTEMS

(75) Inventor: Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/766,163

(22) Filed: Apr. 23, 2010

(65) Prior Publication Data

US 2011/0264990 A1    Oct. 27, 2011

(51) Int. Cl.
*G06F 17/50* (2006.01)
*G06F 17/15* (2006.01)
*G06F 17/17* (2006.01)
*G01R 35/00* (2006.01)
*G01D 3/00* (2006.01)

(52) U.S. Cl. ............ 716/106; 716/111; 716/136; 703/2; 703/16; 702/109; 702/124

(58) Field of Classification Search ................... 716/106, 716/111, 136; 703/2, 16; 702/109, 124
See application file for complete search history.

(56) References Cited

U.S. PATENT DOCUMENTS

| | | | |
|---|---|---|---|
| 4,184,630 A | 1/1980 | Woodward et al. | |
| 4,498,172 A | 2/1985 | Bhavsar | |
| 5,357,528 A | 10/1994 | Alon et al. | |
| 5,841,867 A | 11/1998 | Jacobson et al. | |
| 6,026,420 A | 2/2000 | DsJardins et al. | |
| 6,598,063 B1 | 7/2003 | Tang et al. | |
| 6,820,029 B2 * | 11/2004 | Fang et al. | 702/120 |
| 2002/0082796 A1 * | 6/2002 | Fang et al. | 702/120 |
| 2004/0204926 A1 * | 10/2004 | Neittaanmaki et al. | 703/2 |

FOREIGN PATENT DOCUMENTS

| | | |
|---|---|---|
| JP | 63219031 A | 9/1988 |
| JP | 08329124 A | 12/1996 |

OTHER PUBLICATIONS

Schwartz, J.T.; Fast Probabalistic Algorithms for Verification of Polynomial Identities; Date: Oct. 1980; pp. 701-717; ACM Journal.
Naor, M.; Oblivious Polynomial Evaluation; Date: 2006; vol. 35, Issue 5; SIAM Journal on Computing Archive, 31 pages.
Sawada, J.; Formal Verification of Divide and Square Root Algorithms Using Series Calculation; Date: 2002; IBM Austin Research Laboratory, 19 pages.

* cited by examiner

*Primary Examiner* — Phallaka Kik
(74) *Attorney, Agent, or Firm* — Eustus D. Nelson; Robert C. Rolnik

(57) ABSTRACT

A verification tool receives a finite precision definition for an approximation of an infinite precision numerical function implemented in a processor in the form of a polynomial of bounded functions. The verification tool receives a domain for verifying outputs of segments associated with the infinite precision numerical function. The verification tool splits the domain into at least two segments, wherein each segment is non-overlapping with any other segment and converts, for each segment, a polynomial of bounded functions for the segment to a simplified formula comprising a polynomial, an inequality, and a constant for a selected segment. The verification tool calculates upper bounds of the polynomial for the at least two segments, beginning with the selected segment and reports the segments that violate a bounding condition.

20 Claims, 5 Drawing Sheets

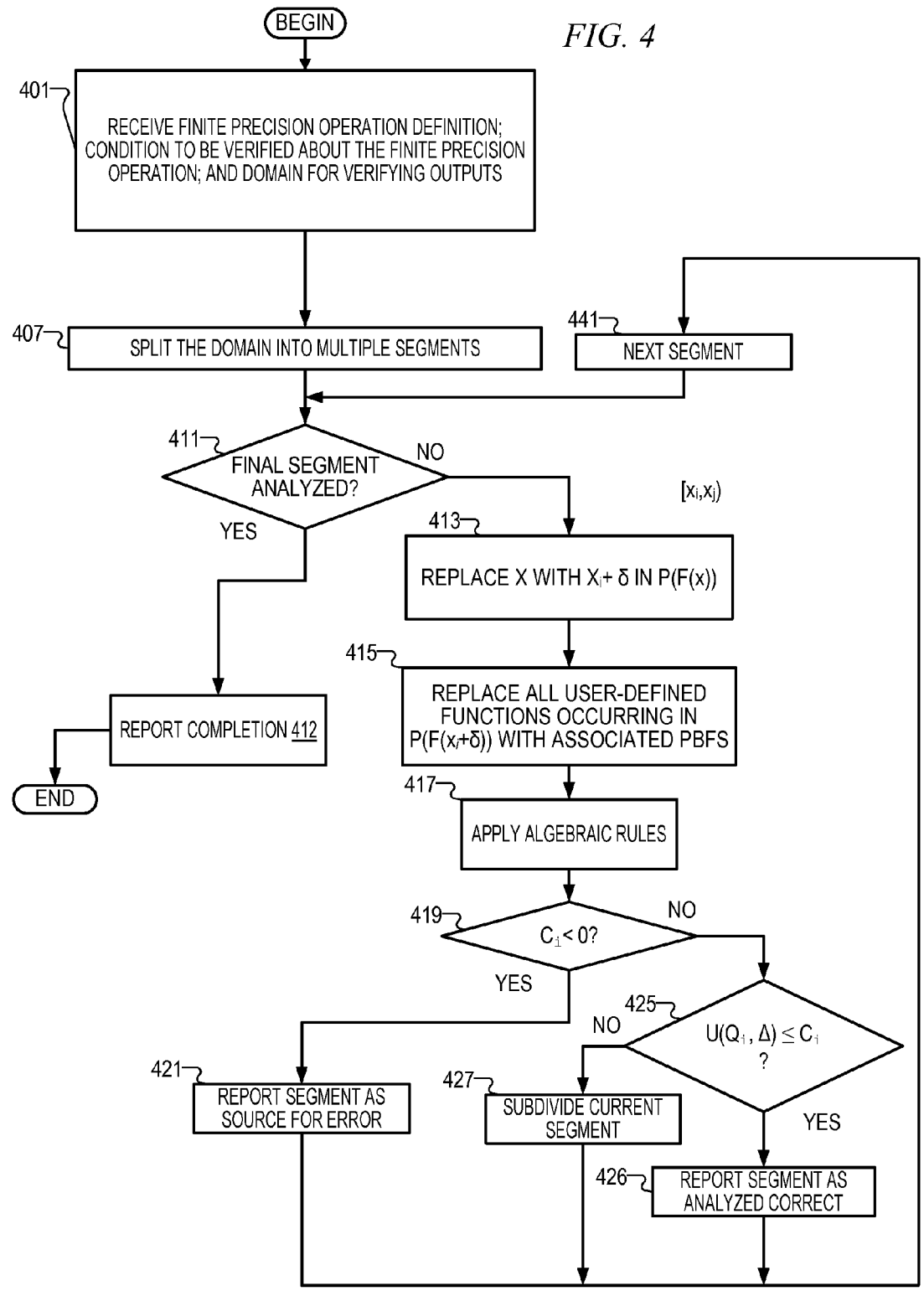

FIG. 5

Simplify (P(x), [$x_i$, $x_j$])
- 501 — 1. Substitute $X_i + \delta$ for X in P(x). Variable, $\delta$, satisfies $|\delta| \leq x_j - x_i$
- 502 — 2. Replace user-defined functions with the corresponding PBF
- 503 — 3. Expand and simplify to normalize the polynomial
- 504 — 4. Move the constant term to the right of $\leq$ and non-constant terms to the left. Return the resulting inequation $Q_i(\delta) \leq C_i$

- 601 — $U(c, \Delta) = |c|$ where c is a constant.
- 603 — $U(\delta, \Delta) = \Delta$ where $\delta$ is a variable.
- 607 — $U(Q_1 + Q_2, \Delta) = U(Q_1, \Delta) + U(Q_2, \Delta)$
- 609 — $U(Q_1 \times Q_2, \Delta) = U(Q_1, \Delta) \times U(Q_2, \Delta)$
- 611 — $U(e(Q_1), \Delta) = B(U(Q_1, \Delta))$ where $|x| \leq b \Rightarrow |e(x)| \leq B(b)$ holds for error function e

FIG. 7

Evaluate(P(x), [$x_0$, $x_n$]) {
- 702 — S := {[$x_0$, $x_1$), [$x_1$, $x_2$), ..., [$x_{n-1}$, $x_n$)}
- 703 — While ( $S \neq \varnothing$ ) {
- 704 —   Pick a segment [$x_i$, $x_j$) $\in$ S, and S := S/[$x_i$, $x_j$)
- 705 —   ($Q_i \leq C_i$) := Simplify(P(x), [$x_i$, $x_j$))
- 706 —   If $C_i \leq 0$, then return fail with xi as a failure point.
- 707 —   If $U(Q_i, x_j - x_i) > C_i$, then S := S $\cup$ {[$x_i$, $x_k$), [$x_k$, $x_j$)} for some new k.

}
  return success
}

VERIFYING THE ERROR BOUND OF NUMERICAL COMPUTATION IMPLEMENTED IN COMPUTER SYSTEMS

FEDERALLY SPONSORED RESEARCH OR DEVELOPMENT

This invention was made with United States Government support under Agreement No. B554331, awarded by the Department of Energy. The government has certain rights in the invention.

BACKGROUND OF THE INVENTION

1. Field of the Invention

The present invention relates generally to a computer implemented method, data processing system, and computer program product for evaluating a design under test (DUT). More specifically, the present invention relates to formally verifying the error bounds of numerical algorithms implemented in computer hardware and/or computer instructions.

2. Description of the Related Art

Manufacturers and developers of integrated circuits, commonly referred to as chips, rely on bits to provide binary representations of numbers. An acceptable drawback to this approach is that some rational non-integer numbers are approximated by rounding or otherwise dropping the least significant bits from a resultant calculation to provide an approximation of a numerical function. An approximation can be a truncation of one or more least significant bits, or other rounding that may adjust a result of a computation to a less than accurate final or intermediate result. The drawback is acceptable because the developers make promises concerning results of numeric functions, namely, that errors will remain within an accepted range or be bounded by an upper limit. Nevertheless, it can be a costly and time-consuming process to confirm such promises, also known as a specification. Normally, such a process confirms the algorithm before the algorithm is implemented in products. Nevertheless, the process influences product roll-out, acceptance of the product, and any later remedial work to compensate for a product that fails to meet the promises made earlier by the company.

Often, complex numerical functions, such as divide, square root, and trigonometric functions, are implemented as an iterative algorithm that approximates the infinitely precise result of a function. For example, a widely-known Newton-Raphson algorithm works as follows. It starts with an initial guess of a result for the implemented function, such as divide. Then, it applies mathematical operations to adjust the guess to more accurate approximations. After a number of iterations, a computer implementing the Newton-Raphson algorithm will result in an approximation that is very close to the infinitely precise result of the function. Finally, the last iteration is rounded to the finite precision result which will be returned by the algorithm.

In general, formal verification involves rigorously proving that a computing system satisfies an associated specification. In certain cases, the specification of a numerical computation can be given as a mathematical formula that sets an upper bound to errors tolerated in the computation for all inputs that the computation is expected to solve. In the case of divide, square root, and trigonometric functions, the correctness can be given as a mathematical formula that bounds the error of the approximation before the final rounding. A formal verification program checks that the specification is met by applying a number of programs such as bit-level equivalence checkers, model checkers, and theorem provers. It is important to recognize, that the implementing of such a function is frequently only approximated by the result given by the implemented formula that approximates the function. Thus, an approximation of a numerical function is the combined output produced or predicted to be produced by a data processing system that implements the approximated function with a series of finite precision outputs.

Numerical computation of computer hardware and software, for example floating-point systems, can be formally verified. Automated approaches, like bit-level equivalence checking, have been used to verify relatively simple floating point operations, such as add or multiply operations. However, the bit-level model checking fails to scale well to more complex mathematical operations, such as divide, square root, and trigonometric functions.

Other techniques such as mechanical theorem proving have been successfully used to verify such complex mathematical operations. However, mechanical theorem proving require tedious manual interactions between the computer and human experts. This cost makes mechanical theorem proving for numerical functions impractical in many cases. In the past, there is no known technique that can automatically verify complex numerical functions such as divide, square root, and trigonometric functions.

SUMMARY OF THE INVENTION

A computer implemented method for verifying error tolerances. A verification tool receives a finite precision definition for an approximation of an infinite precision numerical function implemented in a processor in the form of a polynomial of bounded functions. The verification tool receives a domain for verifying outputs of segments associated with the infinite precision numerical function. The verification tool splits the domain into at least two segments, wherein each segment is non-overlapping with any other segment. The verification tool converts, for each segment, a polynomial of bounded functions for the segment to a simplified formula comprising a polynomial, an inequality, and a constant for a selected segment among the at least two segments. The verification tool calculates, for each segment, the upper bound of the polynomial for the at least two segments, beginning with the selected segment. The verification tool reports the segments that violate the bounding condition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a verification tool performing operations in accordance with an illustrative embodiment of the invention;

FIG. 5 is an example of an algorithm evaluation process in accordance with an illustrative embodiment of the invention;

FIG. 6 is a set of rules used to calculate an upper bound in accordance with an illustrative embodiment of the invention;

FIG. 7 is an algorithm for an algorithm evaluation process that can be used in accordance with an illustrative embodiment of the invention.

DETAILED DESCRIPTION OF THE PREFERRED EMBODIMENT

Figure 1:
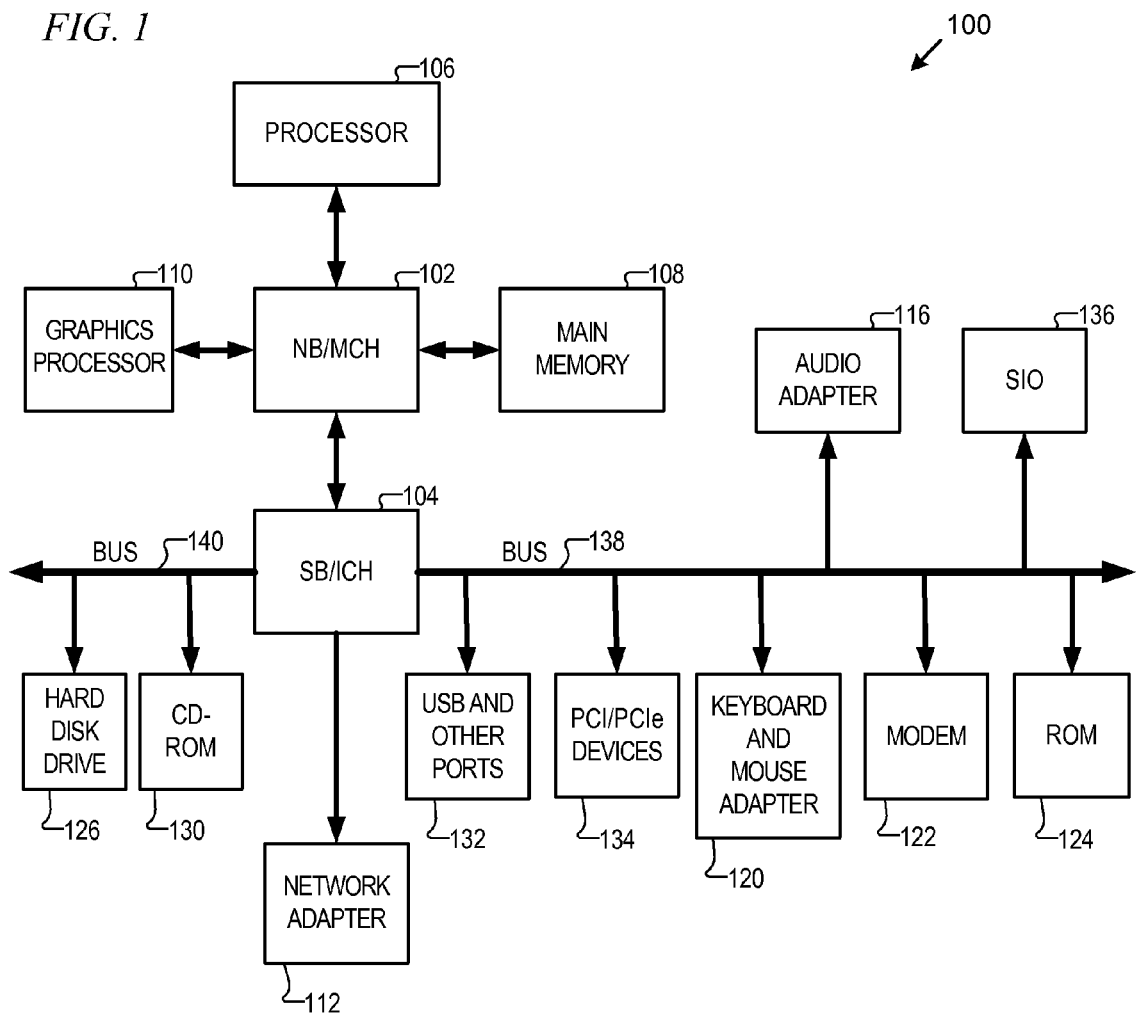
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. Ethernet adapters and other packet based interfaces may operate as a communication unit. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
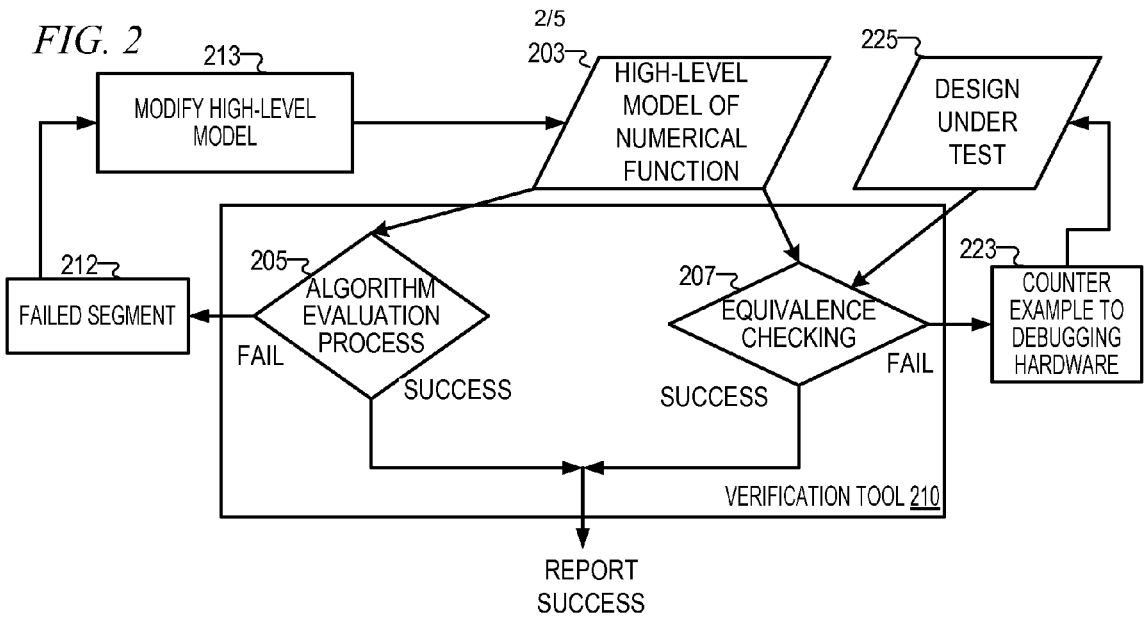
FIG. 2 is a block diagram of a verification tool in a data processing system in accordance with an illustrative embodiment of the invention.

FIG. 2 is a block diagram of a verification tool in a data processing system in accordance with an illustrative embodiment of the invention. Verification tool 210 may rely on rules to calculate an upper bound as one or more mathematical operations that preserve equations or inequality expressions. These rules may be formulated, for example, according to the conventions of a Computational Logic for Applicative Common Lisp (ACL2) or according to any other suitable theorem prover. Input to the verification tool may be in the form of a high-level model of a numerical function. A finite precision definition for an approximation of an infinite precision numerical function may be a polynomial of bounded functions. The high-level model may be a finite precision definition. An infinite precision numerical function may be approximated or may include, for example, functions selected from among a reciprocal of an input, division of inputs or a square root of an input, among others.

Two processes may rely on the high-level model, namely, an algorithm evaluation process 205 and an equivalence checking process 207, each of which may be implemented on a data processing system. The algorithm evaluation process may be performed on multiple segments of the domain of numeric inputs expected for the numerical function. If failed segments are detected, failed segment 212 may provide guidance at a step of modifying the high-level model 213. Accordingly, the process may iterate through successive refinements of high-level models.

The high-level models, such as high-level model of numerical function 203, may be provided as input to equivalence checking process 207. In addition, equivalence checking process 207 may receive design under test 225. In cases of the equivalence checking failing, the equivalence checking process 207 may provide a counter-example to debugging hardware 223. Accordingly, further refinements to design under test 225 may occur. Each of the above processes may be performed in parallel.

An absence of failed segments or failed equivalence checking can be reported as a success for the tested high-level model of the numerical function.

Output from the algorithm evaluation process may be interfaced to a bit-level equivalence checking process 207 which is implemented as a bit-level equivalence checker. A bit-level equivalence checker is an implementation of a process that verifies a register transfer level description of hardware is compliant with a high-level model. In addition, output may be reported or displayed in display. Both bit-level equivalence checking process 207 and algorithm evaluation process 205 may operate as hosted on a data processing system.

The illustrative embodiments report the input values with which the finite precision numerical operation implemented in a computer system fails to satisfy the tolerance. Implicitly, completing tests across the domain for all segments or input values that may make up the domain, indicates that for those remaining segments, the processor design under test or software satisfies the error tolerance. An error tolerance is a maximum error between the finite precision operations that is implemented in the design under test and the infinite precision numerical function for which the design under test is to provide approximated results. In addition, responsive to negative results to the segments, the device under test may be modified until operation of the various embodiments indicates that all segments satisfy the error tolerance. It is appreciated that modifications to the numerical function may be implemented by adding changes to hardware, an application, an operating system or any other set of instructions that may be executed on a processor. The numerical function can be implemented as instructions performed on a processor.

All the finite precision numerical operations, including the infinite precision numerical function to be approximated, are described in the mathematical expression called a polynomial of bounded functions. A polynomial of bounded functions (PBF) is described using Backus-Naur Form.

$$\text{PBF}::=\text{Constant}|\text{Variable}|\text{PBF}+\text{PBF}|\text{PBF}*\text{PBF}|\text{ERR\_FUNC}(\text{PBF},\ldots,\text{PBF})|\text{USR\_FUNC}(\text{PBF},\ldots,\text{PBF}) \quad (1)$$

In other words, the PBF is either a constant, an input variable, an addition of two PBFs, a multiplication of two PBFs, an application of error functions to a single PBF or multiple PBFs, or an application of user-defined function on a single PBF or multiple PBFs.

An error function is a symbolic representation of the errors associated to mathematical functions. A single input error function, e, must satisfy the following mathematical property: $|x| \leq \Delta \Rightarrow |e(x)| \leq B(\Delta)$ where B is some polynomial function which is monotonic in the positive domain. Accordingly, for each error function, e, a different B may be applicable. In other words, if the absolute value of the input x to the error function e(x) is bounded by $\Delta$, then the absolute value of the error function e(x) is bounded by $B(\Delta)$. A multiple value error function satisfies similar conditions.

An error function is treated symbolically by the verification tool, thus the data processing system does not have to be able to compute the actual value of e(x). This feature permits a verification program to apply logic to simplify the error term, explained below, in relation to the PBF.

A user-defined function is a function introduced by the user. A single-argument user-defined function, f, is defined as f(x)=expr, where expr is a PBF which includes only x as a variable, and no other variables. Multiple-argument user-defined functions are defined in a similar fashion.

The PBF is used to model the finite precision formula which is implemented in the device under test (DUT), as shown, for example, as high-level model of a numerical function 203 in FIG. 2. A finite precision operation definition is described by a PBF. Some examples follow. The finite precision operation definition can be modeled version of a design under test that generates an output for one or more inputs. The output may be a simulated output that is calculated by a data processing system that simulates the design under test.

An example of a PBF used to model the finite precision formula is the floating point rounding operation defined in the Institute of Electrical and Electronics Engineers (IEEE) 754 standard that rounds a value to the nearest representable (in binary) floating-point number. A 53-bit double-precision number can be defined as a user-defined function round(x) as follows:

$$\text{round}(x) = x + E_{near,53}(x) \tag{2}$$

The right-hand side of this equation is a PBF with an error function, $E_{near,53}$. The error function $E_{near,53}$ satisfies the following bounding condition. $|E_{near,53}(x)| \leq 2^{-54} \times b$ for any $|x| \leq b$.

Similarly, double-precision addition of floating-point numbers may be defined as a user-defined function, using the nearest mode rounding described above, as:

$$\text{add}(x,y) = \text{round}(x+y). \tag{3}$$

Double-precision multiplication of two floating-point numbers may be similarly defined as a user-defined function as:

$$\text{mult}(x,y) = \text{round}(x \times y). \tag{4}$$

Another example of a PBF used to model the finite precision formula is the operation to extract a bit-field from the fraction of a floating-point number. A floating-point number x is typically represented with a sign bit, sgn, an exponent, expo, and a fraction, frac, where:

$$X = (-1)^{sgn} \times 2^{expo} \times \text{frac}. \tag{5}$$

In this representation, X is normalized so that frac is a number such that $1 \leq \text{frac} < 2$. A binary representation of frac can be written as $1.x_1 x_2 x_3 \ldots$, where $x_i$ represents a binary digit of 1 or 0. The function, $\text{FracFld}_{l,r}(x)$, is a function that returns the binary integer $x_l x_{l+1} \ldots x_{r-1} x_r$. In other words, $\text{FracFld}_{l,r}(x)$ returns the bit-field from bit position l to bit position r of the fraction of the normalized floating point number x.

Figure 3:
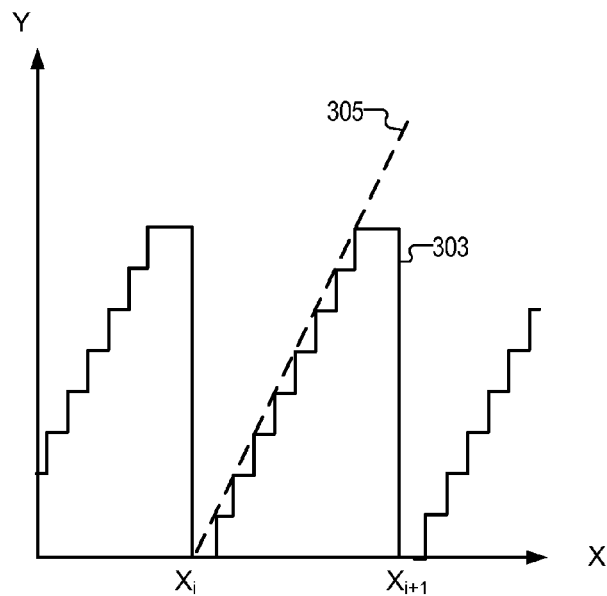
FIG. 3 is a chart of a representative finite precision operation and approximation of the finite precision operation, in accordance with an illustrative embodiment of the invention.

FIG. 3 is a chart of a representative finite precision operation and approximation of the finite precision operation, in accordance with an illustrative embodiment of the invention. The chart shows $\text{FracFld}_{l,r}$ as solid line 303. An approximation 305 of $\text{FracFld}_{l,r}$, represented as a dashed line, is a linear function $y = (x - x_i) \times 2^r$ in the domain $[x_i, x_{i+1}]$ such that $x_i = 2^{-l} \times i$, and $1 \leq x_i < 2$. Accordingly, the PBF for FracFld can be defined as a user-defined function as follows:

$$\text{FracFld}_{l,r}(x) = (x - x_i) \times 2^r + E_{FracFld\ l,r}(x), \tag{6}$$

with error function, $E_{FracFld\ l,r}(x)$, satisfying $$E_{FracFld\ l,r}(x) \leq 1. \tag{7}$$

Indeed the separation of solid line 303 and approximation 305 never exceeds 1.

A formula of PBFs is defined as $$\text{PBF\_Formula} ::= \text{PBF} <= \text{PBF} \tag{8}$$

The error bound conditions we would like to verify should be represented as a formula of PBFs.

FIG. 4 is a flowchart of a verification tool performing operations in accordance with an illustrative embodiment of the invention. Initially, the verification tool receives the definition of a finite precision operation represented as a PBF, as well as the condition to be verified and the domain for verifying outputs of the segments (step 401). The finite precision operation definition may be an approximation of an infinite precision numerical function and is represented as a PBF. For example, the finite precision operation may be encoded in microcode. The segments are associated with the infinite precision numerical function such that the segments are within the domain. A domain is the range of inputs for which a maximum error is warranted with respect to products implementing the design under test (DUT). The domain may be the basis, together with the finite precision operation definition, for outputs covering at least two segments that are subsets of the domain.

Next, the verification tool may split the domain into multiple segments (step 407). Each segment may be a non-overlapping set of values within the domain. Each segment may initially be equal in size to each other. The segments can be expressed as $[x_0, x_1), [x_1, x_2), \ldots [x_{n-1}, x_n)$, for first segment, second segment, and last segment, respectively, among a number, 'n' of segments. In the nomenclature for segments, the left square brace '[' denotes an inclusive limit, while the right round brace ')' denotes a limit, up to, but not including the right-most term.

Next, the verification tool may determine if a final segment is analyzed (step 411). Analysis of a segment can include processing of the segment by the verification tool using steps 413-427, explained further below. A positive determination that the final segment is analyzed may cause processing report completion (step 412). The processing may terminate thereafter.

However, if more segments remain to be analyzed (negative outcome at step 411), the verification tool can first pick a segment to be analyzed shown in the flowchart as $[x_i, x_j)$. Accordingly, the size of segment is $\Delta = x_j - x_i$. Similarly, the finite precision operation received by the verification tool can be F(x), and the condition to be verified, received by the verification tool, can be P(F(x)). In the next step, the verification tool replaces x with $x_i + \delta$ in P(F(x)) (step 413). As a result, the verification tool obtains $P(F(x_i + \delta))$. Verifying the $P(F(x_i + \delta))$ with input range $0 \leq \delta \leq \Delta$ is the equivalent to verifying P(F(x)) for the segment, $[x_i, x_j]$. Next, the verification tool may expand the definition of the user-defined functions, by replacing all the user-defined functions occurring in P(F $(x_i + \delta)$) with associated PBFs (step 415). Next, the verification tool may simplify the result of previous step by applying algebraic rules such as associativity, commutatively, and distributivity laws of addition and multiplication (step 417). The verification tool also moves the constant terms to the right of an inequality symbol, and non-constant terms to the left of the inequality symbol. This simplification results in a simplified formula, $Q_i(\delta) \leq C_i$, where $C_i$ is a constant, and $Q_i(\delta)$ is a normalized polynomial without a constant term. Here, a normalized polynomial means that the formula is a summation of monomials, where a monomial is a product of variables and applications of error functions, and all identical monomials are each combined to a single monomial to form a group of monomials or a polynomial.

Next, the verification tool may determine if the constant side or $C_i$ of the inequality is determined to be less than zero (step 419).

If the constant side $C_i$ of the inequality is determined to be less than zero, the verification tool reports the $x_i$ as a source for error in the device under test (step 421). In fact, it can be mathematically proven that when $C_i$ is less than 0 for the segment, $[x_i, x_j]$, the original PBF formula is invalid at $x = x_i$. The report may be generated to a display, as described further below, with respect to FIG. 8.

On the other hand, the constant side may be greater than or equal to zero. Accordingly, a negative determination is made at step 419. As a result, a further determination is made to determine whether the evaluation of the polynomial satisfies the inequality (step 425). This determination is done by computing the maximal possible value that the polynomial side $Q_i$ can take by computing $U(Q_i,\Delta)$. If $U(Q_i,\Delta) \leq C_i$, then the polynomial always satisfies $Q_i \leq C_i$. Thus, the verification tool marks the current segment as being analyzed successfully, and reports segment as analyzed correct (step 426). On the other hand, in the case $U(Q_i,\Delta) > C_i$, the verification tool may subdivide the current segment, and add the resulting sub-segments back to the pool of segments to be further analyzed (step 427). Following steps 421, 426, and 427, the verification tool may obtain the next segment (step 441).

It is appreciated that the step of obtaining a next segment, in order to form a selected segment, is dependent on whether additional segments actually exist that have not yet been analyzed. Accordingly, a further determination of whether a final segment is reached is further processed at step 411. In other words, for as long as segments exist that are not yet analyzed, the verification tool may repeat one or more of steps 413-427 with respect to each of those segments. Otherwise, a positive result at step 411 results in the process reporting completion and terminating thereafter.

Generally, the collective reports from steps 412, 421, and 426 for all segments will either indicate first, one or more segments fail to satisfy the error tolerances, or second, that all segments satisfy the error tolerances. In order to report that all segments satisfy the error tolerances, the data processing system may produce no reports of the violation of error tolerances followed by an indication of completion of all processing tasks. Indication of completion of all processing tasks can be displaying a command line prompt. Alternatively, an indication of completion of processing tasks can be more overt, such as showing a progress bar to a display that indicates 100% complete, or placing text in the display that states that the data processing system completed processing on all segments. Accordingly, reporting the segments includes within the scope of the reports, either positively reporting all failures to verify (e.g. polynomial exceeds the constant) per segment, and by implication, the absence of reports of other segments indicates that those other segments are verified with respect to the error tolerance.

FIG. 5 is an example of an algorithm evaluation process in accordance with an illustrative embodiment of the invention. The formula $P(x)$ may be implemented in the device under a test, and a verification may discern the maximum error over a domain interval of a given $\delta$ width where $|\delta| \leq x_j - x_i$ is met at line 501. The value $x_i + \delta$ can be substituted in place of 'x' in $P(x)$. The user-defined function can be replaced with the PBF that defines the user-defined function at line 502. Next, normalization of the polynomial may be performed by expanding the formula using associativity, commutatively, and distributivity laws of addition and multiplication at line 503. Accordingly, a monomial of each order in the polynomial may have corresponding constants aggregated as a factor to the monomial.

A final product of the algorithm evaluation process, $Q_i(\delta) \leq C_i$, yields two sides to an inequality where constant terms are moved to the right of the 'equal to or greater than' symbol, while the non constant terms are moved to the left at line 504. On the first side or left-hand side, $Q_i(\delta)$ is a PBF without a constant term and with consolidation of the factors for each monomial. On the second side or right-hand side, the algorithm evaluation process yields a constant or $C_i$.

FIG. 6 is a set of rules used to calculate an upper bound in accordance with an illustrative embodiment of the invention. In this description, $U(Q(\delta), \Delta)$ represents the upper bound of a PBF, $Q_i(\delta)$, when the input variable, $\delta$, satisfies $|\delta| \leq \Delta$. $U(Q(\delta), \Delta)$ is recursively defined with the five rules 601-611. When $Q(\delta)$ is a constant, c, the upper bound of $Q(\delta)$ is the absolute value of c and $U(Q(\delta), \Delta) = |c|$ as shown in 601. If $Q(\delta)$ is a variable, $\delta$, then the upper bound of $Q(\delta)$ is $\Delta$ and $U(Q(\delta), \Delta) = \Delta$ as shown in rule 603. If $Q(\delta)$ is a summation $Q_1(\delta) + Q_2(\delta)$, then the upper bound of $Q(\delta)$ is the summation of the upper bounds of $Q_1(\delta)$ and $Q_2(\delta)$ and $U(Q(\delta), \Delta) = U(Q_1(\delta), \Delta) + U(Q_2(\delta), \Delta)$ as shown in rule 607. If $Q(\delta)$ is a product, $Q_1(\delta) * Q_2(\delta)$, then the upper bound of $Q(\delta)$ is the product of the upper bounds of $Q_1(\delta)$ and $Q_2(\delta)$ and $U(Q(\delta), \Delta) = U(Q_1(\delta), \Delta) * U(Q_2(\delta), \Delta)$ as shown in rule 609. If $Q(\delta)$ is an application of an error function, e, on $Q_1(\delta)$, and the associated condition of e states that $|x| \leq \Delta \Rightarrow |e(x)| \leq B(\Delta)$, then the upper bound of $Q(\delta)$ is the application of B on the upper bound of $Q_1(\delta)$ and $U(e(Q_1(\delta)), \Delta) = B(U(Q_1(\delta),\Delta))$ as shown in rule 611. The user-defined function may not appear on the PBF of the input to the upper bound calculation, because user defined functions are replaced at an earlier stage of algorithm evaluation process. Because all PBF cases are covered, the upper-bound of a PBF can be computed by recursively applying the rules in FIG. 6.

An example of the algorithm evaluation process is the evaluation of a function $F(x) = -455/512 \times (1 + FracFld_{4,10}(x) *2^{-10}) + 967/512$ satisfies a formula $F(x) \times x \leq 257/256$ for a segment beginning at 1 and ending at $129/128$. In this stage of the algorithm evaluation process, $FracFld_{4,10}(x)$ is a function to extract the bit field between bit position 4 and 10 of a normalized floating-point number x, as discussed in equations #6 and #7 above.

$$F(x) \times x \leq 257/256 \qquad (9)$$

Applying the step 413 will replace x with $x_0 + \delta$ subject to $x_0 = 1$ and $|\delta| \leq 1/128$.

$$F(1+\delta) \times (1+\delta) \leq 257/256 \qquad (10)$$

Applying step 415 will expand $F(x)$ and $FracFld_{4,10}(x)$ $$((-455/512) \times (1+\delta+E_{FracFld\,4,10}(\delta) \times 2^{-10})+967/512) \times (1+\delta) \leq 257/256 \qquad (11)$$

Applying step 417 will simplify the above formula to the following.

$$(57/512)\delta - (455/2^{19})E_{FracFld\,4,10}(\delta) - (455/512)\delta^2 - (455/2^{19})\delta \times E_{FracFld\,4,10}(\delta) \leq 1/256 \qquad (12)$$

In this case, the right hand side constant is indeed larger than 0, as may be determined at step 419. Accordingly, the verification tool can proceed to step 425, and calculate the upper bound of $U(Q, 1/128)$, where Q is the left-hand side of equation above.

$$U(Q, 1/128) = \qquad (13)$$
$$\frac{57}{512} \times \frac{1}{128} + \frac{455}{2^{19}} \times 1 + \frac{455}{512} \times \frac{1}{128^2} + \frac{455}{2^{19}} \times \frac{1}{128} \times 1 =$$
$$\frac{120703}{2^{26}} < \frac{1}{256}$$

This equation shows that an evaluation at step 425 is be satisfied. Thus, for this case, the verification tool proceeds to step 426, reporting that the segment is analyzed correctly.

FIG. 7 is an algorithmic description of the verification algorithm in FIG. 4 using a C-like programming language. The algorithm may be instructions executing on a data processing system, such as, for example, data processing system 100 of FIG. 1. Line 702 can be a step to split a domain into multiple segments. Line 702 may be an embodiment, when executed in a data processing system, of step 407 of FIG. 4. Line 703 may be an embodiment, coupled to the data processing system, of step 411 of FIG. 4. Line 704 may be an embodiment, coupled to the data processing system, of step 441 of FIG. 4. Line 705 may be an embodiment, coupled to the data processing system, of steps 413 through 417 of FIG. 4. Line 706 may be an embodiment of steps 419 and 421 of FIG. 4. Line 707 may be an embodiment of steps 425 and 427 of FIG. 4.

Figure 8:
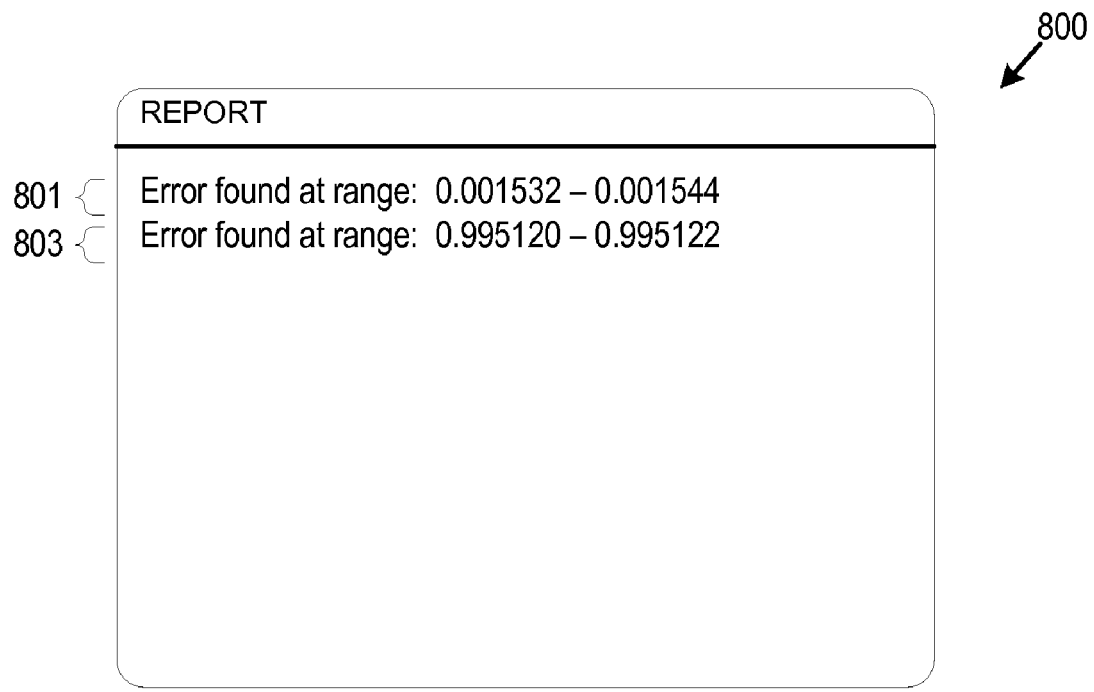
FIG. 8 is an exemplary output that may be displayed to a display in accordance with an illustrative embodiment of the invention.

FIG. 8 is an exemplary output that may be displayed to a display in accordance with an illustrative embodiment of the invention. Report 800 is an exemplary list of segments that either are indicated as satisfying the error tolerance, or a list of segments that are not satisfying the error tolerance. Since many processor designs under test may be expected to satisfy error tolerances over most of the range for the finite precision operations that the processor may implement, it may be more useful to report only the erroneous segments, and by remaining silent, implicitly indicate that all other segments satisfy the error tolerance. Accordingly, report 800, may report two segments to be in error. First indication 801 reports segment 0.001532-0.001544 is not satisfying the bounding condition. Second indication 803 reports segment 0.995120-0.995122 is not satisfying the bounding condition. It is appreciated that an embodiment may report one endpoint may be reported instead of both for a segment that fails to satisfy the bounding condition.

The algorithm evaluation process may be re-used as many times as necessary so that an integrated circuit designer may establish the correctness of his implementation of the finite precision operations as related to the infinite precision numeric function it is to approximate. According to the result of the verification tool, a designer may modify the computer system design either by changing the hardware wiring, changing microcode, upgrading firmware, changing operating systems code, or changing the application program. Microcode is hardware-level instructions and/or data structures that permit implementation of machine code on a processor. Accordingly, in response to completing a run of the finite precision operations by the algorithm evaluation process, the designer may add the microcode including any look-up tables, to the integrated circuit or processor. The microcode may be added to read only memory (ROM), programmable logic arrays (PLA), or any other high-speed memory.

Alternatively, the finite precision operations may be implemented as a series of instructions executed in a microprocessor, where the instructions can be an application or an operating system, or other computer implemented instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for verifying error tolerances of a numerical operation, the method comprising:
   receiving a finite precision definition for an approximation of an infinite precision numerical function, wherein the infinite precision numerical function is implemented in a processor design under test in a form of a polynomial of bounded functions;

receiving a domain for verifying outputs of segments associated with the infinite precision numerical function;

splitting the domain into at least two segments, wherein each segment is non-overlapping with any other segment;

converting, for each segment, a polynomial of bounded functions for the segment to a simplified formula comprising a polynomial, an inequality, and a constant for a selected segment among the at least two segments;

calculating, for each segment, an upper bound of the polynomial for the at least two segments, beginning with the selected segment; and reporting the segments that violate a bounding condition, wherein splitting, converting and calculating are performed by a processor.

2. The computer implemented method of claim 1, wherein reporting further comprises:

determining whether the constant for the selected segment is less than zero; and responsive to a determination that the constant for the selected segment is less than zero, reporting the selected segment as failing to satisfy the bounding condition.

3. The computer implemented method of claim 1, wherein calculating further comprises:

determining whether the constant for the selected segment is greater than zero;

responsive to a determination that the constant for the selected segment is greater than zero, calculating the upper bound of the polynomial for the selected segment;

determining whether the upper bound of the polynomial is less than the constant for the selected segment;

responsive to a determination that the polynomial is greater than the constant for the selected segment, subdividing the selected segment into at least two sub-segments; and calculating, using each sub-segment as a segment, the polynomial and the constant for each sub-segment used as a segment, beginning with the selected segment, wherein the selected segment is a sub-segment used as a segment.

4. The computer implemented method of claim 1, wherein the infinite precision numerical function consists of a function selected from among a reciprocal of an input, division of inputs or a square root of an input.

5. The computer implemented method of claim 1, further comprising:

using the finite precision definition as a high-level model; and verifying the high-level model using a bit-level equivalence checker.

6. The computer implemented method of claim 1, wherein the finite precision definition for the approximation of the infinite precision numerical function implemented in a processor is a plurality of computer implemented instructions configured to operate on the processor.

7. The computer implemented method of claim 1, wherein receiving the finite precision definition comprises defining the finite precision definition as a polynomial of bounded error functions.

8. A computer program product for verifying error tolerances of a numerical operation, the computer program product comprising: a computer readable tangible storage device having computer readable program code embodied therewith, the computer readable program code comprising:

computer readable program code configured to receive a finite precision definition for an approximation of an infinite precision numerical function, wherein the infinite precision numerical function is implemented in a processor design under test in a form of a polynomial of bounded functions;

computer readable program code configured to receive a domain for verifying outputs of segments associated with the infinite precision numerical function;

computer readable program code configured to split the domain into at least two segments, wherein each segment is non-overlapping with any other segment;

computer readable program code configured to convert, for each segment, a polynomial of bounded functions for the segment to a simplified formula comprising a polynomial, an inequality, and a constant for a selected segment among the at least two segments;

computer readable program code configured to calculate, for each segment, an upper bound of the polynomial for the at least two segments, beginning with the selected segment; and computer readable program code configured to report the segments that violate a bounding condition.

9. The computer program product of claim 8, wherein code configured to report further comprises:

computer readable program code configured to determine whether the constant for the selected segment is less than zero; and computer readable program code configured to report the selected segment as failing to satisfy the bounding condition, responsive to a determination that the constant for the selected segment is less than zero.

10. The computer program product of claim 8, wherein code configured to calculate further comprises:

computer readable program code configured to determine whether the constant for the selected segment is greater than zero;

computer readable program code configured to calculate the upper bound of the polynomial for the selected segment, responsive to a determination that the constant for the selected segment is greater than zero;

computer readable program code configured to determine whether the upper bound of the polynomial is less than the constant for the selected segment;

computer readable program code configured to subdivide the selected segment into at least two sub-segments, responsive to a determination that the polynomial is greater than the constant for the selected segment; and computer readable program code configured to calculate, using each sub-segment as a segment, the polynomial and the constant for each sub-segment used as a segment, beginning with the selected segment, wherein the selected segment is a sub-segment used as a segment.

11. The computer program product of claim 8, wherein the infinite precision numerical function consists of a function selected from among a reciprocal of an input, division of inputs or a square root of an input.

12. The computer program product of claim 8, further comprising:

computer readable program code configured to use the finite precision definition as a high-level model; and computer readable program code configured to verify the high-level model using a bit-level equivalence checker.

13. The computer program product of claim 8, wherein the finite precision definition for the approximation of the infinite precision numerical function implemented in a processor is a plurality of computer implemented instructions configured to operate on the processor.

14. The computer program product of claim 8, wherein code configured to receive the finite precision definition comprises defining the finite precision definition as a polynomial of bounded error functions.

15. A data processing system comprising:
- a bus;
- a storage device connected to the bus, wherein computer usable prom code is located in the storage device;
- a communication unit connected to the bus;
- a processor connected to the bus, wherein the processor executes the computer usable code for verifying error tolerances of a numerical operation, wherein the processor executes the computer usable program code to:
- receive a finite precision definition for an approximation of an infinite precision numerical function, wherein the infinite precision numerical function is implemented in a processor design under test in a form of a polynomial of bounded functions;
- receive a domain for verifying outputs of segments associated with the infinite precision numerical function;
- split the domain into at least two segments, wherein each segment is non-overlapping with any other segment;
- convert, for each segment, a polynomial of bounded functions for the segment to a simplified formula comprising a polynomial, an inequality, and a constant for a selected segment among the at least two segments;
- calculate, for each segment, an upper bound of the polynomial for the at least two segments, beginning with the selected segment; and
- report the segments that violate a bounding condition.

16. The data processing system claim 15, wherein in executing computer usable code to report, the processor further executes computer usable code to determine whether the constant for the selected segment is less than zero; and report the selected segment as failing to satisfy the bounding condition, responsive to a determination that the constant for the selected segment is less than zero.

17. The data processing system claim 15, wherein in executing computer usable prom code to calculate, the processor further executes computer usable code to determine whether the constant for the selected segment is greater than zero; and calculate the upper bound of the polynomial for the selected segment, responsive to a determination that the constant for the selected segment is greater than zero; determine whether the upper bound of the polynomial is less than the constant for the selected segment; subdivide the selected segment into at least two sub-segments, responsive to a determination that the polynomial is greater than the constant for the selected segment; and calculate, using each sub-segment as a segment, the polynomial and the constant for each sub-segment used as a segment, beginning with the selected segment, wherein the selected segment is a sub-segment used as a segment.

18. The data processing system claim 15, wherein the infinite precision numerical function consists of a function selected from among a reciprocal of an input, division of inputs or a square root of an input.

19. The data processing system claim 15, wherein the processor further executes computer usable code to use the finite precision definition as a high-level model; and verify the high-level model using a bit-level equivalence checker.

20. The data processing system claim 15, wherein the finite precision definition for the approximation of the infinite precision numerical function is a plurality of computer implemented instructions configured to operate on the processor design under test.

* * * * *